(12) United States Patent
Marti Sendra et al.

(10) Patent No.: US 7,433,562 B2
(45) Date of Patent: Oct. 7, 2008

(54) METHOD OF DIVIDING A GUIDED ELECTROMAGNETIC SIGNAL INTO TWO HALF-POWER SIGNALS USING PHOTONIC CRYSTALS

(75) Inventors: Javier Marti Sendra, Valencia (ES); Alejandro Martinez Abiétar, Valencia (ES); Pablo Sanchis Kilders, Valencia (ES); Francisco Cuesta Soto, Valencia (ES); Jaime García Rupérez, Valencia (ES)

(73) Assignee: Universidad Politecnica de Valencia, Valencia (ES)

( * ) Notice: Subject to any disclaimer, the term of this patent is extended or adjusted under 35 U.S.C. 154(b) by 0 days.

(21) Appl. No.: 10/568,363

(22) PCT Filed: Aug. 14, 2004

(86) PCT No.: PCT/ES2004/000378

§ 371 (c)(1),
(2), (4) Date: Mar. 24, 2006

(87) PCT Pub. No.: WO2005/017586

PCT Pub. Date: Feb. 24, 2005

(65) Prior Publication Data

US 2006/0171634 A1    Aug. 3, 2006

(30) Foreign Application Priority Data

Aug. 14, 2003  (ES)  ................... 200302003

(51) Int. Cl.
*G02B 6/26* (2006.01)

(52) U.S. Cl. ...................................... 385/48

(58) Field of Classification Search .................... 385/48
See application file for complete search history.

(56) References Cited

U.S. PATENT DOCUMENTS 6,101,300 A     8/2000   Fan et al.

(Continued)

FOREIGN PATENT DOCUMENTS

FR          2 841 658 A1     1/2004

OTHER PUBLICATIONS

International Search Report.

(Continued)

*Primary Examiner*—Sung Pak
*Assistant Examiner*—Jerry T Rahll
(74) *Attorney, Agent, or Firm*—Collard & Roe, P.C.

(57) ABSTRACT

The invention relates to a method of dividing the power of an input electromagnetic signal into two equal-power signals with a relative phase difference of 180° between them and an equal propagation delay. The inventive method makes use of a photonic crystal coupler comprising two parallel guides which are disposed close to one another and which are based on coupled cavities. The method consists in exciting the odd mode of the coupler which, owing to the symmetry thereof, ensures that the field maxima coincide in one guide with the minima in the adjacent guide, thereby producing a relative phase difference of 180°. The two output signals are obtained through the spatial separation of the guides forming the coupler, making use of the property possessed by guides in photonic crystals for high transmission efficiency through very tight curves. In this way, the size of the structure can be reduced considerably. The inventive method can be used for both two-dimensional and three-dimensional photonic crystals.

10 Claims, 7 Drawing Sheets

U.S. PATENT DOCUMENTS

| | | | |
|---|---|---|---|
| 6,130,969 A * | 10/2000 | Villeneuve et al. | 385/27 |
| 7,110,641 B2 | 9/2006 | Benesty et al. | |
| 2002/0048422 A1* | 4/2002 | Cotteverte et al. | 385/4 |
| 2004/0033009 A1 | 2/2004 | Soljacic et al. | |

OTHER PUBLICATIONS

S. Noda, et al., "Full Three-Dimensional Photonic Crystals at Near-Infrared Wavelengths", Science, 289, pp. 604-606, 1998.

E. Chow, et al., "Three-dimensional control of light in a two-dimensional photonic crystal slab", Nature, 407, pp. 983-986, 2000.

S. Y. Lin, et al., "Experimiental demonstration of guiding and bending electromagnetic waves in a photonic crystal", Science, 282, pp. 274-276, 1998.

S. Y. Lin, et al., "Highly dispersive photonic band-gap prism", Opt. Lett. 21, 1771, 1996.

M. Bayindir, et al., "Tight-binding description of the coupled defect modes in three-dimensional photonic crystals", Phys. Rev. Lett., vol. 84, No. 10, pp. 2140-2143, 2000.

A. Yariv, et al., "Coupled-Resonator optical waveguide: a proposal and analyis", Opt. Lett., vol. 24, No. 11, pp. 711-713, 1999.

R. Ramaswami et al., "Optical Networks: A practical perspective", Morgan Kaufmann Publishers, 1997.

M. Koshiba, "Wavelength division multiplexing and demultiplexing with photonic crystal waveguide couplers", IEEE J. Lightwave Technol., vol. 19, No. 12, pp. 1970-1975, 2001.

S. Boscolo et al., "Coupling and decoupling electromagnetic waves in parallel 2D photonic crystal waveguides", IEEE J. Quantum Electron, vol. 38, No. 1, pp. 47-52, 2002.

S. Y. Lin, et al., "Low-loss, wide-angle Y splitter at 1.6-mm wavelengths built with a two-dimensional photonic crystal", Opt. Lett. vol. 27, No. 16, pp. 1400-1402, 2002.

M. Bayindir, et al, "Photonic-crystal-based beam splitters", App. Phys. Lett. vol. 77 No. 24, pp. 3902-3904, 2000.

Tokushima, M. et al., "Photonic crystal line defect waveguide directional coupler" Electronic Letters Online, IEE Nov. 22, 2001, vol. 37, No. 24.

Sharkawy, A. et al., "Electro-optical switching using coupled photonic crystal waveguides" Optics Express, vol. 10, No. 20, Oct. 7, 2002, pp. 1048-1059.

Boscolo, S. et al., "Y junctions in photonic crystal channel waveguides: high transmission and impedance matching" Optics Letter, vol. 27, No. 12, Jun. 15, 2002, pp. 1001-1003.

J.D. Joannopoulos, R. D. Meade, and J.N. Winn, "Photonic Crystals: Molding the Flow of Light," Princeton University Press, 1995, pp. 66-77.

N.W. Ashcroft, N.D. Mermin, "Solid State Physics," (Saunders, Philadelphia, 1976) "The Tight-Binding Method," pp. 176-190.

* cited by examiner

FIG. 1

PRIOR ART

METHOD OF DIVIDING A GUIDED ELECTROMAGNETIC SIGNAL INTO TWO HALF-POWER SIGNALS USING PHOTONIC CRYSTALS

CROSS REFERENCE TO RELATED APPLICATIONS

Applicants claim priority under 35 U.S.C. §119 of Spanish Application No. P200302003 filed Aug. 14, 2003. Applicants also claim priority under 35 U.S.C. §365 of PCT/ES2004/000378 filed Aug. 14, 2004. The international application under PCT article 21(2) was not published in English.

OBJECT OF THE INVENTION

The present invention consists of a method that allows the power of an input electromagnetic signal to be divided into two equal-power signals with a relative phase difference of 180° and an equal propagation delay. This method makes use of a coupler consisting of two parallel guides disposed close to one another in a photonic crystal. Both two-dimensional (2D) and three-dimensional (3D) crystals could be used as the underlying concept is the same. The advantages of the divider structure are its small size, which makes it suitable for integration numerous divider units as functional units of more complex devices, the high operational bandwidth, which is an advantage with respect to other methods for dividing power which are sensitive to frequency, and synchrony between the output signals from the device, which is an essential feature for high-speed signal processing.

The field for application of the present invention is in any device based on 2D or 3D photonic crystal technology designed to operate over any frequency range, from optical signals and microwave/millimeter signals, to signals with frequencies in the visible or infrared range.

BACKGROUND OF THE INVENTION

Photonic crystals are formed from materials with a dielectric constant that varies periodically in one, two or three spatial dimensions. This periodicity gives rise to the appearance of frequency bands in which signal propagation is not permitted inside the crystal. These forbidden frequency bands are commonly known as the Photonic Band Gap (PBG). Light propagation can be controlled by inserting defects that alter the periodicity of the crystal. The insertion of linear defects leads to the appearance of guided modes at frequencies within the forbidden band allowing the propagation of light only in the defect created. Although total control of the propagation of light is achieved by using 3D photonic crystals, control of light in three dimensions can also be achieved with planar 2D photonic crystals, thus reducing the cost and complexity of manufacture. In this case, the light is confined to the direction perpendicular to the plane of the crystal if the dielectric constant of the materials above and below the crystal is less than the dielectric constant of the defect created in the crystal. The main advantages of the devices based on photonic crystals are a considerable reduction in size, allowing highly integrated optical circuits to be produced, and the possibility of implementing curved guides with radii of the order of the wavelength of the signal that is being propagated without significant losses, which is essential for the development of microphotonics.

Due to the scaling properties of Maxwell's equations, photonic crystals can be made to have a forbidden band in any spectral range provided the structure is appropriately scaled and provided materials are chosen that have suitable properties in the chosen spectral range. As it is extremely costly to manufacture structures in the visible or infrared frequencies, in which the spatial periodicity should be less than one micron, photonic crystals have been implemented to work at microwave frequencies where the periodicity is of the order of cm. To do this, bars of dielectric material with a high refraction index are used that form periodic lattices in air. The properties of these structures can by and large be extrapolated to the structures corresponding to optical frequencies, but with the advantage that at microwave frequencies, manufacture and measurement of the properties is much easier.

In a photonic crystal, a waveguide can be created from a chain of equally spaced cavities or point defects along a certain direction of the crystal. This type of guide is known as a coupled cavity waveguide. The propagation along these guides is explained by photons jumping between adjacent cavities due to overlap of the evanescent field tails. The coupled cavity waveguides have certain characteristics that make them particularly interesting: on the one hand, a theoretical expression can be derived for the dispersion ratio of the guide modes from a tight-binding approach used in solid-state physics. On the other hand, transmission along curves with very tightly curved radii is very efficient provided that symmetry of the cavity mode is appropriate. In addition, the group velocity of this type of guide is very low, tending to zero at the edges of the band, and so highly efficient non-linear processes are expected in this type of guide, as well as high dispersion that could be of use in a number of applications.

On the other hand, couplers in photonic crystal technology can be implemented in the same way as used by other more mature technologies, such as integrated guides or fiber optics: disposing two parallel wave guides close to one another. If both guides are identical and single moded when placed in proximity, the two interact and the guide mode of an isolated guide divides into two modes for the complete system of the two parallel waveguides. These modes have even and odd symmetry with respect to the plane equidistant from the guide axis. In addition, these modes have different propagation constants, implying that they travel at a different velocity along the coupler. This behavior causes a signal to be excited in one of the two guides, after a certain distance the wave passes to the adjacent guide and, once again, returns to the original guide after covering the same distance. That is, there is a periodic transfer of power between guides. In 2D photonic crystals, couplers have been proposed and studied formed from guides made by completely eliminating a row of cylinders in dielectric cylinder structures over air. The performance of a directional coupler has also been shown experimentally at optical frequencies in a planar photonic crystal with air holes on a silicon substrate. In addition, a coupler has been proposed in a 2D photonic crystal of air holes in dielectric for commutation applications.

The power dividers/combiners are fundamental blocks in any optical network or device. Their function is to distribute the power of an input signal to two output ports with certain percentages at each output. If the percentages are 50%, the divider is usually called a 3 dB divider. These blocks can be implemented mainly in two ways (see FIGS. 1a and 1b): either using a directional coupler designed such that the power is divided equally between the output ports at on output (FIG. 1a), or by means of a Y-shaped structure in which the input guide divides into two output guides at a certain angle to minimize losses (FIG. 1b).

For the first case, the phase difference between the output signals is 90% whereas for the second case, both outputs are in phase. In addition to couplers, the implementation of Y-shaped dividers has also been proposed in photonic crystal technology and it has been demonstrated experimentally at both microwave and optical frequencies.

DESCRIPTION OF THE INVENTION

The invention relates to a method of dividing the power of an input electromagnetic signal into two equal-power signals with a relative phase difference between the two of 180° and an equal propagation delay. The structure can also be designed so that the phase difference between output signals is 0° although, whatever the phase difference, the output signals travel the same physical path and are in synchrony.

Said method makes use of a coupler implemented in a photonic crystal and consisting of two parallel guides located close to one another and based on coupled cavities.

The physical basis of the proposed method is based on exciting the odd mode of the coupler, which because of its symmetry, ensures that field maxima in one guide coincide with minima in the adjacent guide so achieving a relative phase difference of 180 degrees. The two output signals are obtained by spatial separation of the guides that make up the coupler, making use of the property that possess the guides in photonic crystals of high transmission efficiency through tight curves, a property which allows the size of the structure to be considerably reduced.

The method is valid both for two-dimensional (2D) and three-dimensional (3D) photonic crystals as the underlying concept is the same.

The advantages of the divider structure are its small size, which makes it suitable for integration of several dividing units as functional units of more complex devices, large bandwidth, and synchronization of the two output signals of the structure, which allows high-speed signal processing.

By means of the same method, a divider could be obtained with the output signals in-phase if, instead of odd mode, the even mode of the coupler is used.

The photonic crystal comprises a lattice of cylinders grouped in columns that can adopt any value for the lattice constant (distance between cylinders closest to one another), was well as any radius and height of the cylinders. Likewise, the method is applicable for any difference of refraction indexes between the material of the columns, the material that surrounds the columns and the material above and below the crystal.

The photonic crystals can adopt any type of lattice, particularly a triangular lattice or square lattice.

The dielectric guide can have any type of configuration to create the coupler, (width and height of the nucleus and layers that surround it), was well as any refraction index, including also the optical fiber.

The method is likewise applicable to any type of guide in a photonic crystal that is used to inject and extract signals from the coupling region.

DESCRIPTION OF THE FIGURES

To complement the description being made and in order to facilitate a better understanding of the characteristics of the invention, in accordance with a preferred example of a practical embodiment thereof, as an integral part of such description, a set of figures is included in which, for illustrative purposes, and in no way limiting, the following has been represented:

FIGS. 1a and 1b show the most widely used structures in optical circuits for dividing the power of an input signal at two output ports.

PREFERRED EMBODIMENT OF THE INVENTION

Figure 1:
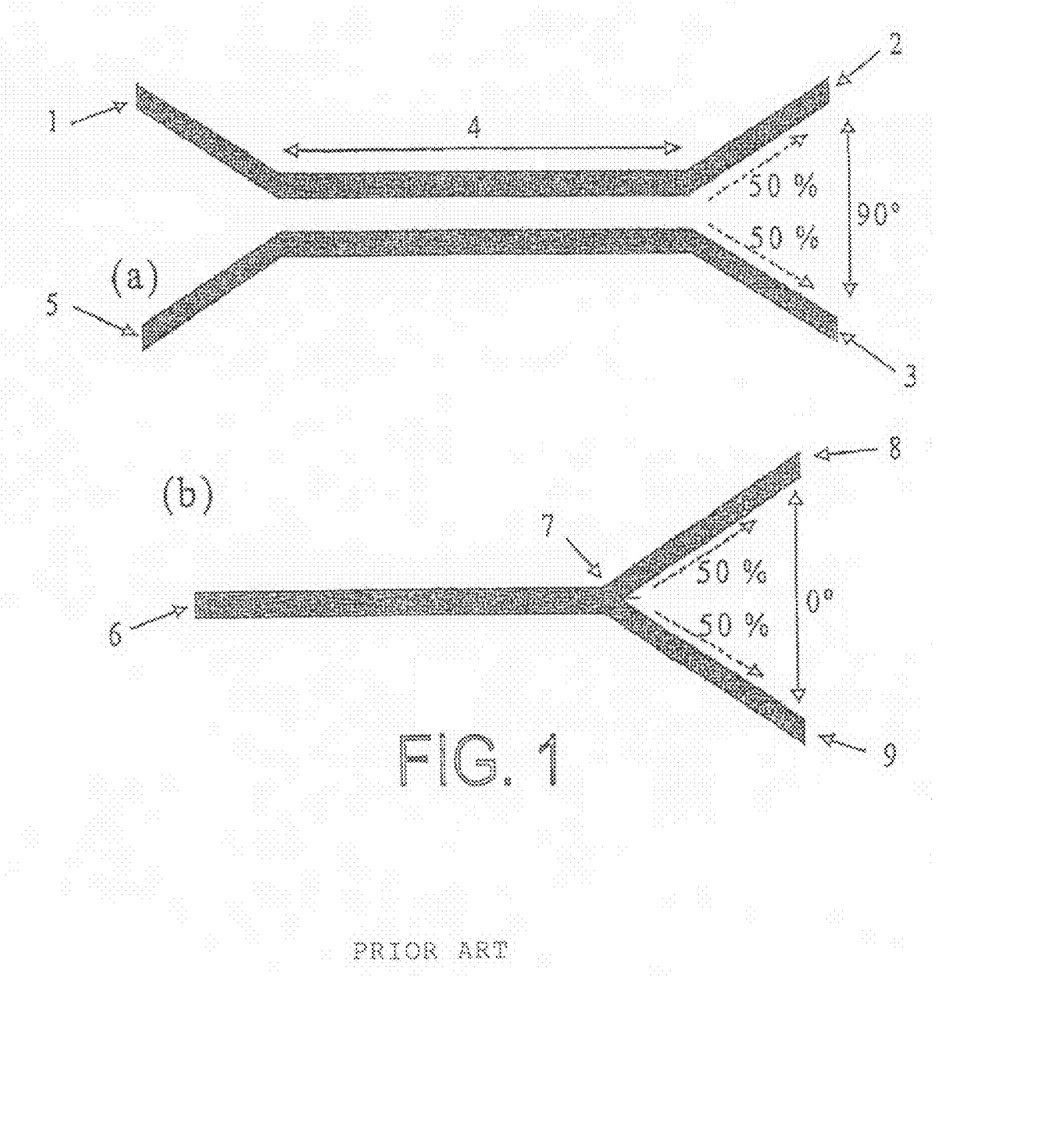
FIG. 1a shows a directional coupler in which a periodic transfer of power occurs between guides such that, with an appropriate selection of the length of the coupler, a certain ratio of powers can be obtained at the output ports.
FIG. 1b shows a Y-shaped divider in which the input guide divides into two output guides such that both carry the same power.

FIG. 1 shows the two structures that are widely used in optical circuits to divide the power of an input signal at two output ports: FIG. 1a shows the directional coupler formed from two equal parallel guides close to one another in which periodic transfer of power between guides occurs in the coupling region (4) such that with suitable selection of the length of the coupler, it is possible to obtain a certain ratio of powers at the output ports (2)-(3). If this ratio is 50% for each port, that is, the power of the input signal (1) is evenly distributed between the output ports (2)-(3), the relative phase difference between the two is 90°. At the input port (5), power is not introduced. Because coupling depends on frequency, exact 50% division only occurs for one frequency, although in the spectral range either side of this frequency, it will be close to 50%. FIG. 1b shows a Y-shaped divider in which the input guide (6) divides into two output guides (8)-(9) such that both channel the same power. The angle of the output guides should be designed in order to maximize the power at each of the output guides. The area of division (7) should also be suitable designed. Both structures can be implemented with 2D and 3D photonic crystal technology. These two structures are described in order to subsequently compare them with the invention that is detailed here and to show the advantages that the present invention has with respect to these structures.

Figure 2:
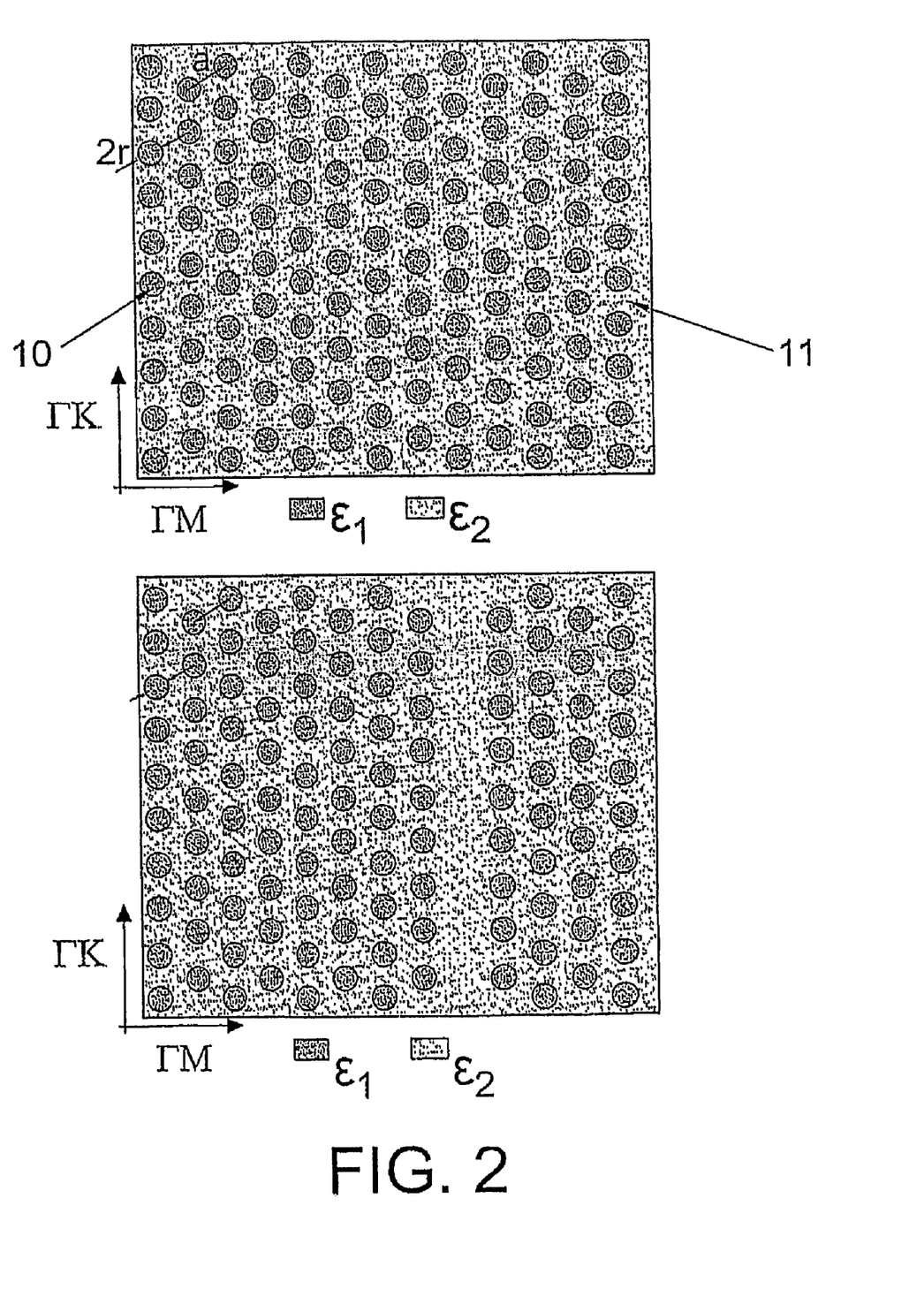
FIG. 2 schematically represents a 2D photonic crystal with hexagonal symmetry and periodic structure in the ΓK and ΓM directions, whereas it remains invariant in the direction perpendicular to the plane of periodicity.

In order to describe the present invention and offer results that verify the behavior, as a preferred embodiment, a 2D photonic crystal is chosen as shown in FIG. 2. This photonic crystal consists of a hexagonal lattice with a lattice constant a (distance between the center of the cylinders closest to one another) of dielectric cylinders (10) with a high refraction index (permittivity $\epsilon_1$) and radius r on a medium (11) with a low refraction index (permittivity $\epsilon_1$). The structure is periodic in the plane in which the cylinders are distributed and is described by the directions ΓK and ΓM, whereas it is constant in the direction perpendicular to the plane of periodicity. This photonic crystal has a forbidden band for modes with transversal magnetic polarization (TM), that is, modes with the electric field in the direction perpendicular to the plane of the crystal. This embodiment is selected for verification at microwave frequencies in the laboratory. However, the present invention could be realized in 2D crystals with square symmetry, with another transversal form of the cylinders, interchanging materials of high and low refraction index, and even using a 3D photonic crystal without losing its general characteristics.

Figure 3:
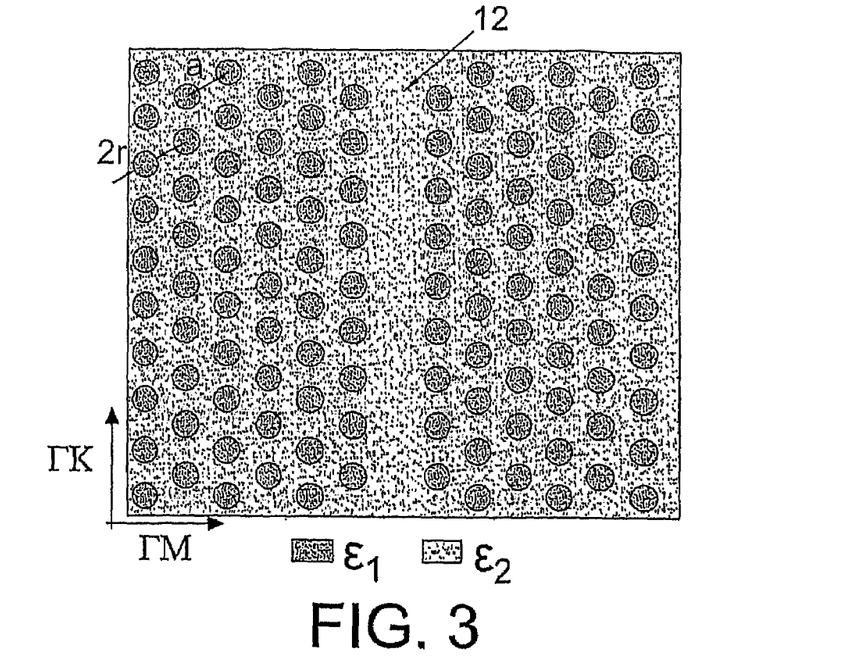
FIG. 3 shows a waveguide created in the photonic crystal shown in FIG. 2 by eliminating a row of columns of high index in the ΓK direction.
Figure 4:
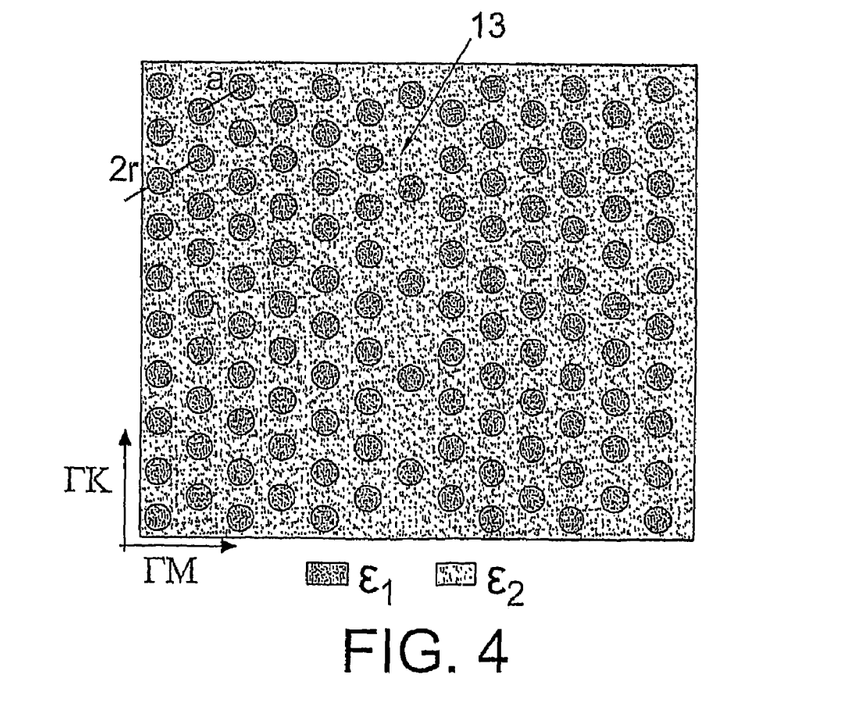
FIG. 4 shows a coupled cavity waveguide created in the photonic crystal shown in FIG. 2 by eliminating every second column of high index in the ΓK direction.

FIG. 3 shows an example of a waveguide (12) created in the 2D photonic crystal of FIG. 2 by means of suppression of a row of cylinders along the ΓK direction. On creating the guide, there is a mode with TM polarization confined to the linear defect with frequencies within the forbidden band, and so the linear defect acts as a waveguide. It is also possible to create a guide from coupled cavities (13) as shown in FIG. 4. In this case, a chain of cavities is created and propagation is due to photons jumping between neighboring cavities due to overlap of the tails of the field confined to the cavity. In the particular case of FIG. 4, the cavities are created by eliminating a high refractive index cylinder and the separation between them is d=2a along the ΓK direction. Similarly, for the waveguide (12), there is a TM guide mode with frequencies within the forbidden band.

Figure 5:
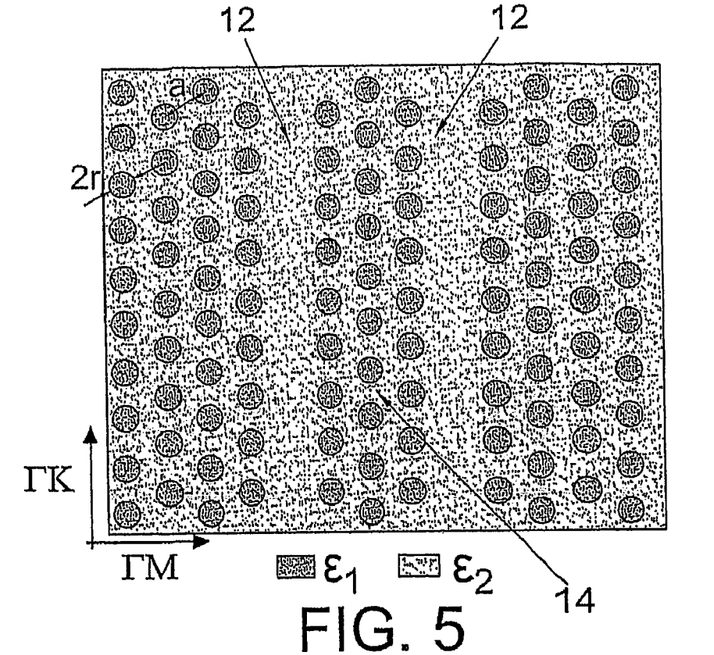
FIG. 5 shows a coupler created in the photonic crystal shown in FIG. 2 consisting of two guides such as those shown in FIG. 3 that are parallel and separated by three rows of cylinder of high index.

If two wave guides (12) are located close together in the 2D photonic crystal as shown in FIG. 5, a coupler is obtained. Due to the proximity of the guides (12) the mode of an isolated guide splits into two modes for the coupler with even and odd symmetry with respect to the plane equidistant from the axes of the parallel guides (12). These modes have different propagation constants, which because of the periodicity of the structure in the direction of the guides, are limited to the first Brillouin zone. FIG. 7 shows the structure of the bands for modes with TM polarization (12) described in FIG. 3 and of the modes of the coupler described in FIG. 5 for a separation of one cylinder between guides in the separation region (14). The vertical axis represents normalized frequencies in units of c/a, where c is the speed of light in vacuum. The guide mode for the isolated guide is shown by a broken line (15), whereas the even modes (16) and odd modes (17) of the coupler are shown with a solid line. For the preferred embodiment, the parameters chosen are: $\epsilon_1$=10.3, $\epsilon_2$=1, r=0.133a. The transfer of power between guides of the coupler occurs in the spectral range (18) in which the even and odd modes coexist. However, we can see two spectral ranges (19) and (20) in which only the odd mode is present. We can use this range in which only the odd mode exists to create a power divider, as the signal will travel along the two guides with a phase difference of 180° and be of equal power because of the odd symmetry. However, because the coupled cavity waveguides (13) have better transmission properties along tight curves than the guides (12), which is extremely important when introducing and extracting signals as will be seen a posteriori, for the preferred embodiment the structure shown in FIG. 6 will be used, although the underlying concept for the invention that is detailed here is exactly the same: excite the odd mode of the coupler in the photonic crystal in a spectral region in which only this mode is present and spatially separate at the output the two guides that comprise the coupler to obtain two equal-power signals with a phase difference of 180°.

Figure 6:
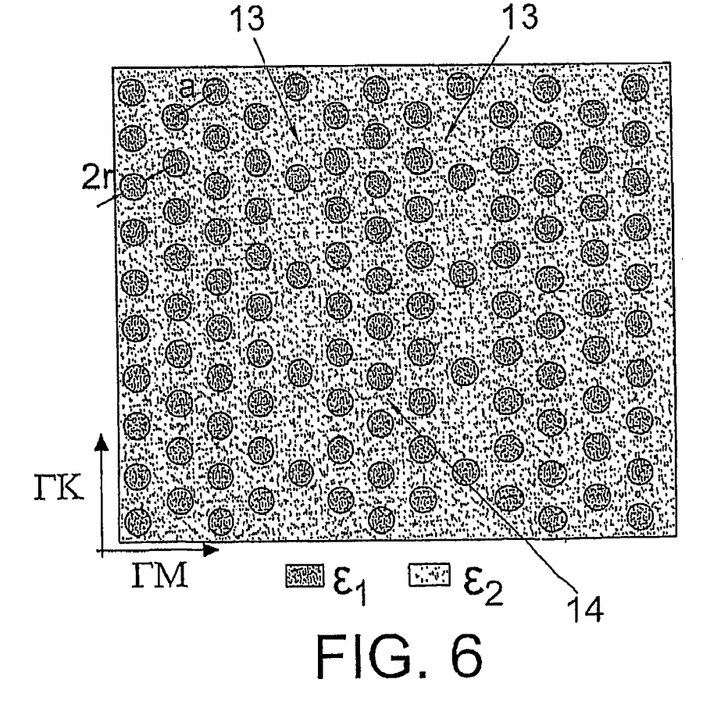
FIG. 6 shows a coupler of coupled cavity waveguides created in the photonic crystal shown in FIG. 2.
Figure 7:
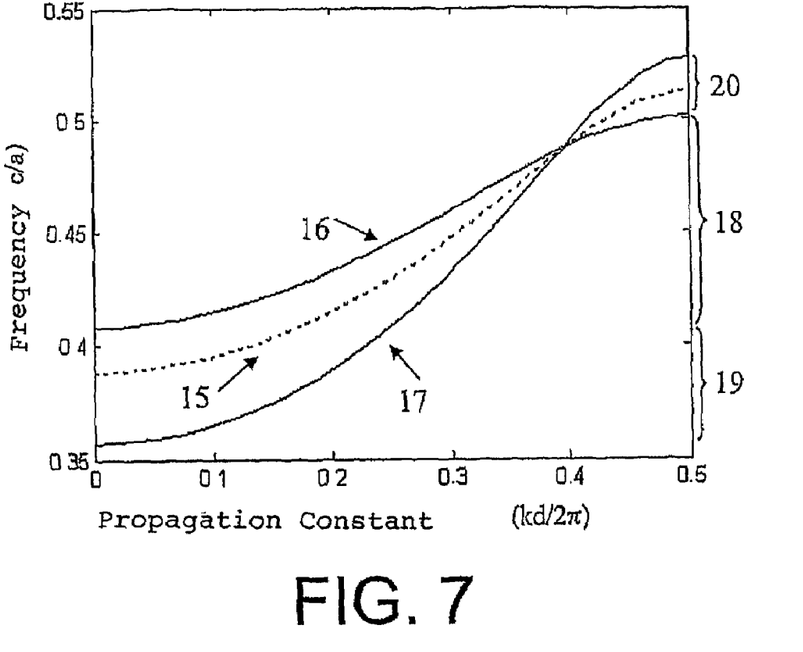
FIG. 7 shows the band structure of the modes guided with TM polarization of a guide such as that shown in FIG. 3 (broken line) and a coupler such as the one shown in FIG. 5.
Figure 8:
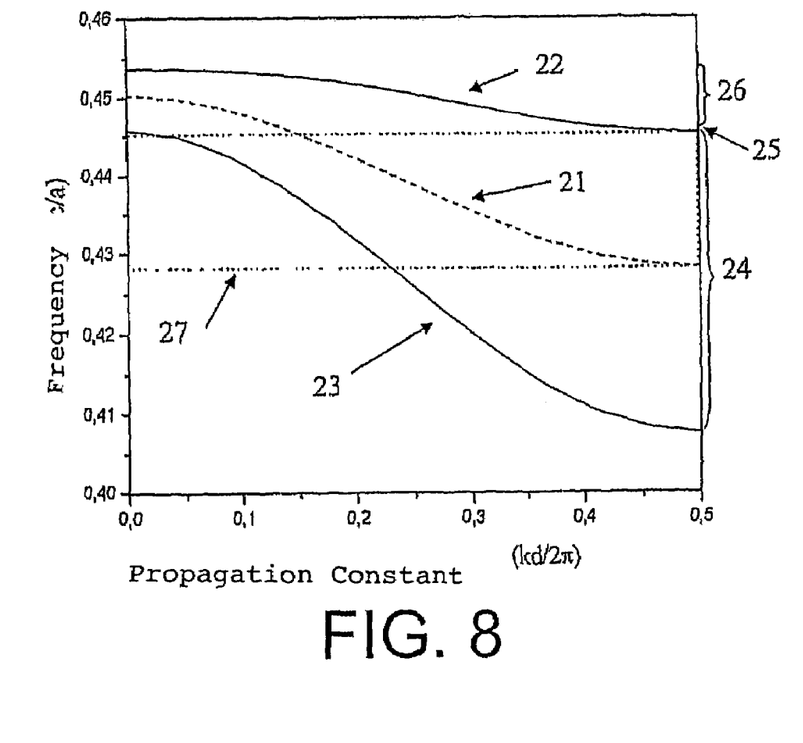
FIG. 8 shows the band structure of the guide modes with TM polarization of coupled cavities such as the one shown in FIG. 4 (broken line) and a coupler of coupled cavity waveguides (solid line) such as the one shown in FIG. 6 and which constitutes the coupling section of FIG. 9.

FIG. 6 shows the coupler formed by the two coupled cavity waveguides (13). The two guides (13) are separated by a region (14) which in this case consists of three rows of cylinders of high refraction index. FIG. 8 shows the structure of bands of the guide modes for TM polarization of the coupled cavity waveguide (13) and the coupler of the coupled guides of FIG. 6 for a separation of a row of cylinders of high refraction index in the region between the guides (14). As in FIG. 7, on the vertical axis, normalized frequencies are represented in units of c/a and on the horizontal axis, the propagation constants limited to the first Brillouin zone. The guide mode of the isolated guide is shown with a broken line (21), and the even modes (22) and odd modes (23) of the coupler as a solid line. Here, it is observed that the even and odd modes are much more uncoupled from one another with respect to the bands of the coupler of FIG. 5. This is due to the fact that in the coupler of FIG. 6, the coupling is of the same order of magnitude in the longitudinal direction of the guides (ΓK) as in the transversal direction (ΓM), whereas in the coupler shown in FIG. 5, coupling is much stronger in the longitudinal direction due to a smaller separation between adjacent cavities. Thus, we have a large spectral region (24) in which only the odd mode exists and which can be used to implement the power divider with a phase difference of 180°. The spectral region where only the even mode is present (26) is not as wide, and the region where both modes coexist is almost indiscernible (25) due to extensive uncoupling. These are the results for the preferred embodiment, but a design could be drawn up in which the even and odd modes did not coexist in frequency and the whole of the region of the odd mode (23) would be available to implement the divider.

From the results presented earlier, the method is presented for dividing electromagnetic signals with a phase difference of 180° between outputs. This method is described in the structure shown in FIG. 9 for the particular case of the preferred embodiment, for which the values of the parameters used previously are maintained. The central part of the divider structure (31) is a coupler of coupled cavity waveguides as shown in FIG. 6, with a separation of a row of cylinders in the region (14). In the particular case of FIG. 9, it is comprised of N=5 cavities along the direction of propagation. To enter the divider structure (31), in this particular embodiment coupled cavity waveguides (13) are used due to the high transmission efficiency in tight curves that this type of guide offers. Thus, there is an input coupled cavity waveguide (28) and two output coupled cavity waveguides (29) and (30). Guides (12) can also be used for the input and output ports. The spectral range of operation of the divider will be the intersection between the range (24) in which only an odd mode is present (23) and the range in which one guide mode is present (21) for the input and output guides. Thus, the range of operation is restricted to the dotted rectangle (27) in FIG. 8.

Figure 10:
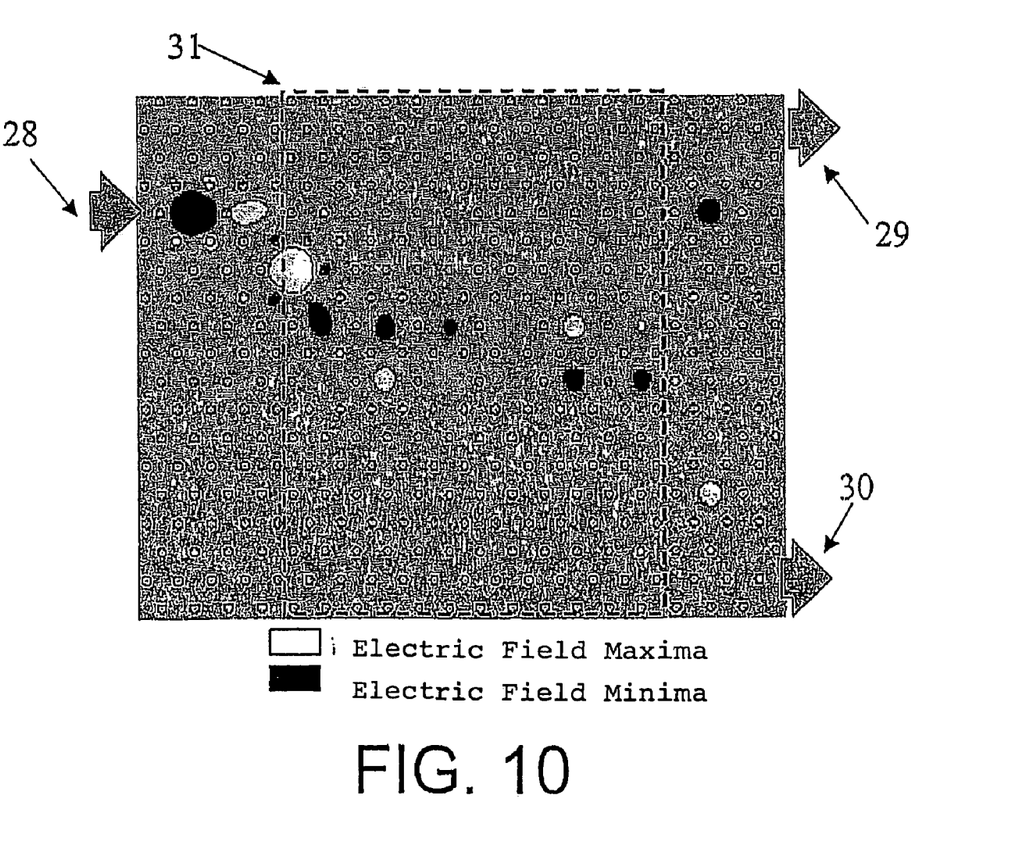
FIG. 10 shows the electric field pattern parallel to the axis of the cylinders for a monochromatic wave of normalized frequency 0.44 c/a, where c is the speed of light in vacuum (within the operating range of the coupler) which is injected into the power divider structure shown in FIG. 9.

In order to verify the nature of the power divider and 180° phase-shifting of the proposed method, in FIG. 10 a simulation is shown with a method of finite differences in the time domain of the electric field distribution parallel to the axis of the cylinders for a monochromatic wave with a normalized frequency 0.44 (which lies in the operating range of the ). On introducing this signal into the input port (28), the signal reaches the section of the coupler that, in this case, consists of N=6 cavities, and excites the odd mode. The field maxima are shown in white shades and the minima in black shades. It is observed that in the region of coupling, the maxima of one of the guides correspond to minima with the adjacent one, and vice versa, which confirms that the exciting mode is of odd symmetry. At the output, use is made of the property of spatial periodicity of the 2D photonic crystal to divide the guides of the coupler into two output points (29) and (30). The odd symmetry is maintained at the output ports, and so the phase difference between them is 180°. In addition, the path covered by the two signals through the structure is identical and so they are synchronized. This property is very important, as high speed signals can be used without delays at the outputs. If, for example, it is desired to implement a divider with a phase difference of 180° from a divider with a difference of 90°, this could be done by adding an additional path in one of the output ports that adds an extra phase difference of 90°. However, this mechanism will also add to the propagation delay and so the condition of synchrony between output signals would not be met, unlike the proposed method.

Figure 11:
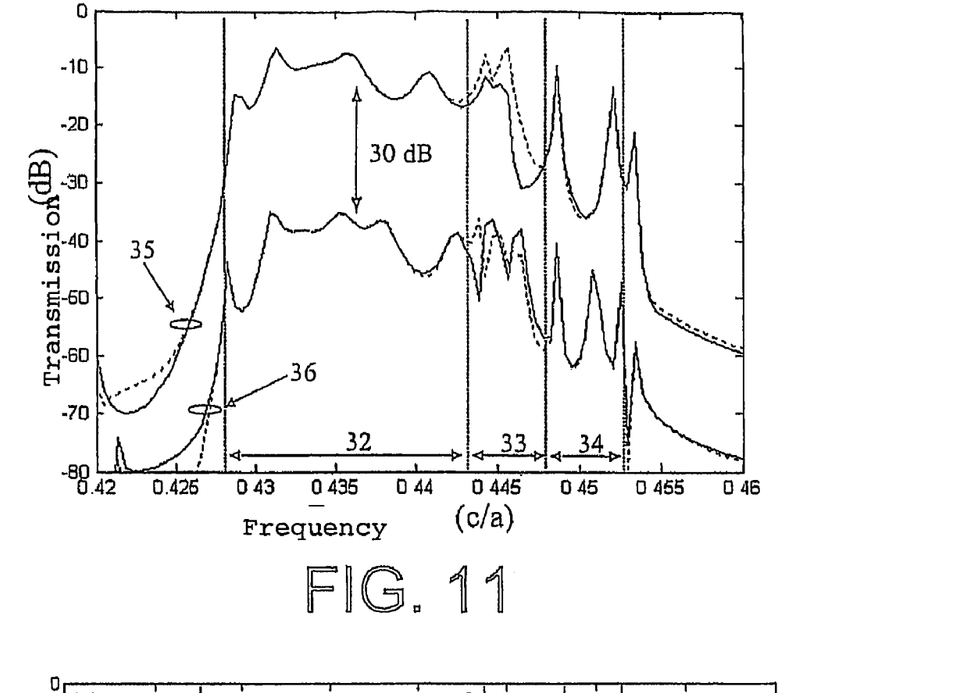
FIG. 11 shows the power transmission spectrum of the preferred embodiment of the structure shown in FIG. 9 for the particular cases N=4 and N=6.

In order to analyze the frequency behavior of the divider, a power transmission spectrum is obtained at both outputs by means of a simulation with a finite differences method in the time domain. The results are shown in FIG. 11, for two particular cases of length of coupler: N=4 (35) and N=6 (36). The response (36) is shifted 30 dB downwards for better visualization. The solid line is the response for output (30) and the broken line for output (29) in FIG. 10. Three spectral ranges are observed of different behavior in the structure: (32), (33) and (34). In the range (32), both outputs have the same power, which confirms that the structure behaves as a power divider. The fact that the output power is not constant over frequency is because of the contribution from spurious reflections due to lack of modal adaptation between the different sections of the structure. Comparing with FIG. 8, we can say that the range (32) corresponds to the operating range of the divider. This is then the spectral range of interest and the range over which the present invention operates. Other spectral regions (33) and (34) are commented below to check the validity of the above description of the structure shown in FIG. 9. The zone (33) corresponds to the range (25) of FIG. 8 where both even and odd modes are excited. In this case, the power at both output ports does not have to be the same, as can be seen in zone (33). On the other hand, the spectral zone (34) corresponds to the range (26) of FIG. 8 where only the even mode is present, and so the power should be the same at both outputs, as observed in FIG. 11, but without a phase difference between signals. With regard to the influence of the number of cavities N that make up the cavity, we can say that it does not have much effect, and the responses (35) and (36) in the region (32) are very similar and show that both output ports have the same power. In principle, the divider works well from N=2 onwards, because, for N=1, the output guides (29) and (30) are very close to the input guide (28) and the zone (31) does not act as a coupler. For N>1, the divider works correctly and divides the input signal into two equal-power output signals with a phase difference of 180°, and as N increases, the bandwidth will be greater as the Q parameter of zone (31) decreases.

Figure 9:
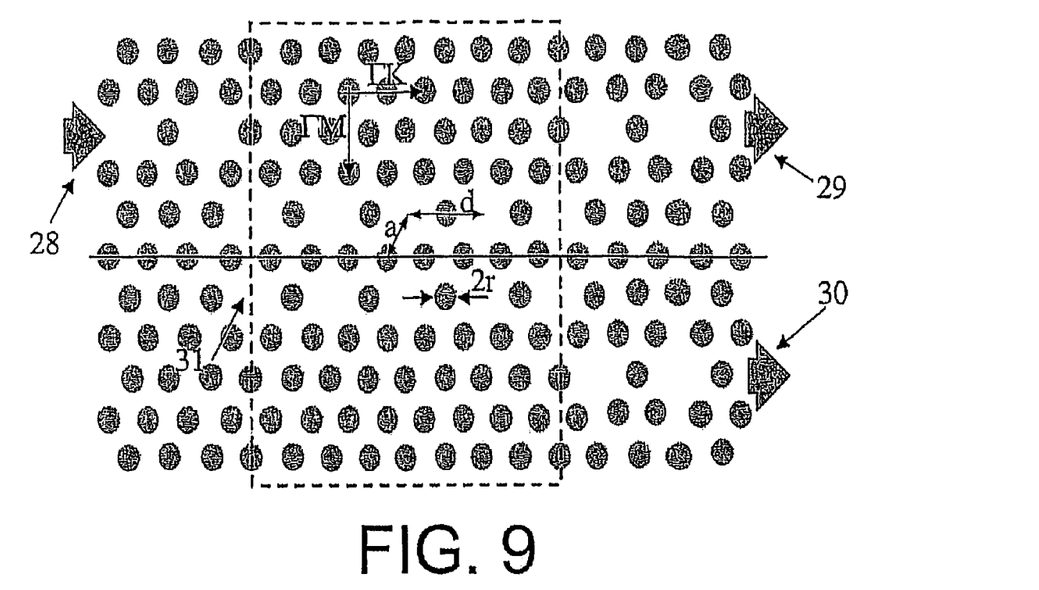
FIG. 9 shows the schematic of a possible embodiment of the present invention: the central part of the structure, highlighted in the broken rectangle in FIG. 9, shows the coupling section that is made up of a coupler of coupled cavity waveguides consisting of N cavities (specifically N=5) such as the one shown in FIG. 6.
Figure 12:
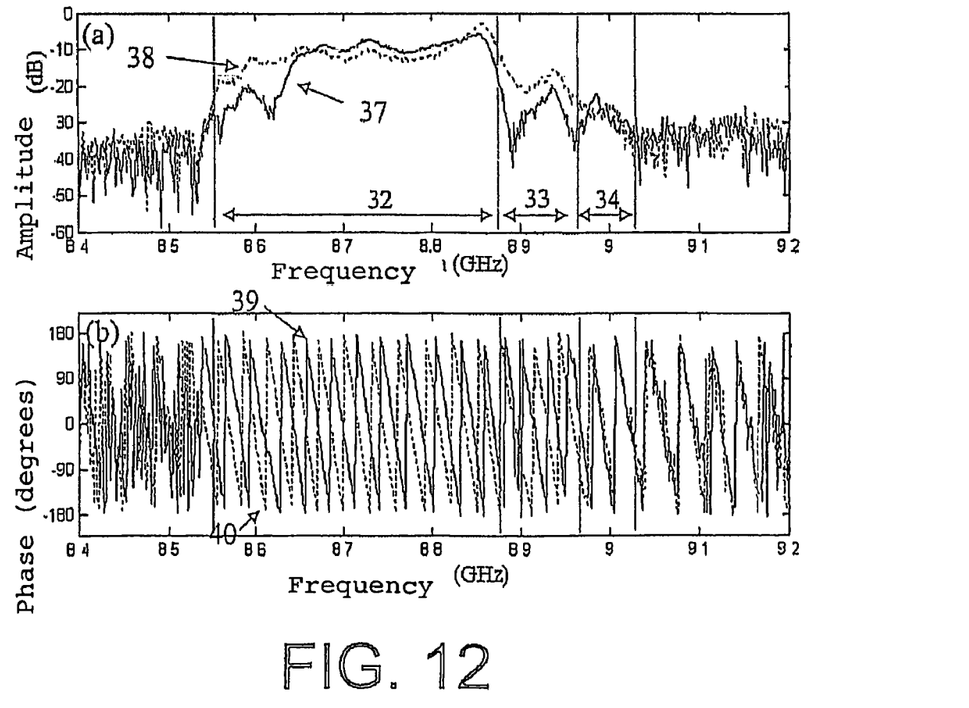
FIG. 12 shows the experimental response in amplitude (a) and phase (b) of the preferred embodiment using 300 cylinders of alumina with a=1.5 cm.

The simulation method available does not allow phase measurements to be obtained and so the divider shown in FIG. 9 was implemented in the laboratory using 300 bars of alumina with constant $\in_1$=10.3, height 10 cm and radius 2 mm. To generate signals and perform the measurements of amplitude and phase, a vectorial network analyzer was used of up to 50 GHz. For r =0.133a as in the simulations, a=1.5 cm was chosen. For the defect-free crystal, as shown in FIG. 2 and for a TM polarized signal, a forbidden band was observed between 7.36 and 11.7 GHz along the ΓK direction. Then, a guide was introduced like the one in FIG. 4 and a guided band was observed for TM polarization between 8.53 and 9.05 GHz. This guided band corresponds to mode (21) in FIG. 8. Afterwards, the divider shown in FIG. 9 with N=4 cavities was introduced and transmission measurements were made of amplitude and phase that are shown in FIG. 12. The amplitude response is shown with the solid line (37) for the output port (29) and with a broken line (38) for the output port (30). The phase response is shown with a solid line (39) for the output port (29) and a solid line (40) for the output port (30). Also shown are the three spectral regions (32), (33) and (34) of differing behavior of the divider already included in FIG. 11. The zone (32) is the one that corresponds to the 180° divider, and in phase response it is observed that the difference in phase between the two outputs (50) and (51) is 180° approximately over the whole range. The difference in amplitude response (37) and (38) in the spectral range (32) is due to imprecision in the implementation of the structure, unwanted external reflections as well as to lack of modal adaptation between the different sections of the divider. The range of the divider is 180° and it occupies a spectral width of around 300 MHz, that is, a relative bandwidth of 3.45 %, sufficient for numerous applications. By way of a simple example, in the optical band of 1550 nm, used in optical communications, a bandwidth greater than 50 nm would be obtained, suitable for applications in optical multiplex networks by division of wavelength. In the range (33), both even and odd modes are excited and there is no stable behavior of the amplitude and phase outputs. Finally, the region (34) would correspond to the zone of excitation of the even mode, which is confirmed if we observe the phase response of the structure where we see that (39) and (40) are in phase in this interval. The response in amplitude for the region (34) shows equilibrium in the output power at both ports (29) and (30). The total power in the excitation region of the even mode (34) is smaller than that in the excitation region of the odd mode (32) because the even mode (22) has a flatter frequency than the odd mode (23), and so greater lack of modal adaptation will occur and a lower global transmission efficiency.

The invention claimed is:

1. Method of dividing a guided electromagnetic signal comprising the step of
    exciting a coupler made by two parallel coupled cavity waveguides close to one another, implemented in a photonic crystal, in which the two coupled cavity waveguides are physically separated without any cavities provided between said cavity waveguides and can be suitably curved,
    the method dividing a guided electromagnetic input signal into two output half-power signals that travel the same physical path without delay between the two; and
    wherein it is based on exciting the odd mode of the coupler obtaining at the output two signals with a 180° phase difference.

2. Method of dividing a guided electromagnetic signal according to claim 1, wherein it is for application in a photonic crystal with a triangular lattice type.

3. Method of dividing a guided electromagnetic signal according to claim 1, wherein it is for application in a photonic crystal with a square lattice type.

4. Method of dividing a guided electromagnetic signal according to claim 1, wherein it can use any type of 2D crystal.

5. Method of dividing a guided electromagnetic signal according to claim 1, wherein it can use any type of 3D crystal.

6. Method of dividing a guided electromagnetic signal comprising the step of exciting a coupler made by two parallel coupled cavity waveguides close to one another, implemented in a photonic crystal, in which the two coupled cavity waveguides are physically separated without any cavities provided between said cavity waveguides and can be suitably curved, the method dividing a guided electromagnetic input signal into two output half-power signals that travel the same physical path without delay between the two; and wherein it is based on exciting the even mode of the coupler to produce half-power signals with 0° phase difference.

7. Method of dividing a guided electromagnetic signal according to claim 6, wherein it is for application in a photonic crystal with a triangular lattice type.

8. Method of dividing a guided electromagnetic signal according to claim 6, wherein it is for application in a photonic crystal with a square lattice type.

9. Method of dividing a guided electromagnetic signal according to claim 6, wherein it can use any type of 2D crystal.

10. Method of dividing a guided electromagnetic signal according to claim 6, wherein it can use any type of 3D crystal.

* * * * *